US011015695B2

(12) United States Patent
Bisarello (10) Patent No.: US 11,015,695 B2
(45) Date of Patent: May 25, 2021

(54) BICYCLE SPROCKET ASSEMBLY COMPONENT AND BICYCLE MOTION TRANSMISSION SYSTEM (71) Applicant: Campagnolo S.r.l., Vicenza (IT)

(72) Inventor: Filippo Bisarello, Costabissara (IT)

(73) Assignee: Campagnolo S.r.l., Vicenza (IT)

(*) Notice: Subject to any disclaimer, the term of this patent is extended or adjusted under 35 U.S.C. 154(b) by 311 days.

(21) Appl. No.: 16/139,380

(22) Filed: Sep. 24, 2018

(65) Prior Publication Data
US 2019/0093749 A1 Mar. 28, 2019

(30) Foreign Application Priority Data

Sep. 26, 2017 (IT) .................. 102017000107554

(51) Int. Cl.
*F16H 55/30* (2006.01)
*B62M 9/10* (2006.01)

(52) U.S. Cl.
CPC ............ *F16H 55/30* (2013.01); *B62M 9/10* (2013.01)

(58) Field of Classification Search
CPC .......... B62M 9/10; B62M 9/12; B62M 9/105; F16H 2055/306; F16H 55/30
USPC ........................................................ 474/160
See application file for complete search history.

(56) References Cited

U.S. PATENT DOCUMENTS

| | | | | |
|---|---|---|---|---|
| 4,198,876 A * | 4/1980 | Nagano | ............... | B62M 9/10 474/160 |
| 5,194,051 A * | 3/1993 | Nagano | ............... | B62M 9/10 474/160 |
| 5,273,495 A * | 12/1993 | Nagano | ............... | B62M 9/00 474/144 |
| 5,503,600 A * | 4/1996 | Berecz | ............... | B62M 9/10 474/160 |
| 5,788,593 A * | 8/1998 | Tiong | ............... | B62M 9/10 474/160 |
| 5,876,296 A * | 3/1999 | Hsu | ............... | B62M 9/10 474/140 |
| 6,142,900 A * | 11/2000 | Takamori | ............... | B21H 5/02 474/152 |
| 6,428,437 B1 * | 8/2002 | Schlanger | ............... | B62M 9/10 474/160 |
| 7,854,673 B2 * | 12/2010 | Oseto | ............... | B62M 9/10 474/82 |
| 7,931,553 B2 * | 4/2011 | Tokuyama | ............... | B62M 9/10 474/160 |
| 8,100,795 B2 * | 1/2012 | Reiter | ............... | B62M 9/10 474/160 |

(Continued)

FOREIGN PATENT DOCUMENTS

TW I396648 B1 5/2013

OTHER PUBLICATIONS

Italian Search Report and Written Opinion in Italian Application No. 102017000107554, dated May 30, 2018, with English translation.

*Primary Examiner* — Henry Y Liu
(74) *Attorney, Agent, or Firm* — Volpe Koenig (57) ABSTRACT A sprocket assembly component with at least one first toothed wheel configured to have the most teeth of the sprocket assembly. The first toothed wheel has an axially inner surface and a supporting assembly that extends in the axial direction up to a free end arranged axially more internally with respect to the axially inner surface of the first toothed wheel.

19 Claims, 6 Drawing Sheets (56) References Cited

U.S. PATENT DOCUMENTS

| | | | | |
|---|---|---|---|---|
| 8,360,911 B2* | 1/2013 | Braedt | B62M 9/10 | 474/164 |
| 8,663,044 B2* | 3/2014 | Lin | B62M 9/10 | 474/160 |
| 8,696,503 B2* | 4/2014 | Oishi | B62M 9/125 | 474/160 |
| 8,834,309 B2* | 9/2014 | Braedt | B62M 9/10 | 474/160 |
| 8,911,314 B2* | 12/2014 | Braedt | B62M 9/10 | 474/160 |
| 10,155,566 B2* | 12/2018 | Sugimoto | B62M 9/105 | |
| 2004/0043855 A1* | 3/2004 | Wei | B62M 9/10 | 474/160 |
| 2004/0070166 A1* | 4/2004 | Valle | B62M 9/10 | 280/260 |
| 2004/0259675 A1* | 12/2004 | Chattin | B62M 9/10 | 474/160 |
| 2006/0128512 A1* | 6/2006 | Tetsuka | B62M 9/105 | 474/160 |
| 2008/0188336 A1* | 8/2008 | Tokuyama | B62M 9/10 | 474/160 |
| 2010/0004081 A1* | 1/2010 | Braedt | B62M 9/12 | 474/160 |
| 2012/0208662 A1* | 8/2012 | Braedt | B62D 55/0963 | 474/160 |
| 2012/0302384 A1* | 11/2012 | Braedt | B62M 9/10 | 474/160 |
| 2013/0049448 A1* | 2/2013 | Kitamura | B60B 27/0068 | 301/110.5 |
| 2015/0210352 A1* | 7/2015 | Sugimoto | B62M 9/105 | 474/80 |
| 2016/0280326 A1* | 9/2016 | Braedt | F16H 55/30 | |
| 2018/0237103 A1* | 8/2018 | Fujita | F16H 55/30 | |

* cited by examiner

BICYCLE SPROCKET ASSEMBLY COMPONENT AND BICYCLE MOTION TRANSMISSION SYSTEM

CROSS REFERENCE TO RELATED APPLICATION(S)

This application claims the benefit of Italian Patent Application No. 102017000107554, filed on Sep. 26, 2017, which is incorporated herein by reference as if fully set forth.

FIELD OF INVENTION

The present invention relates to a bicycle sprocket assembly component and a bicycle motion transmission system having a sprocket assembly.

BACKGROUND

As used herein, the expression "sprocket assembly component" is meant to indicate one or more of the elements of a sprocket assembly for the rear wheel of a bicycle and in particular for at least one toothed wheel.

The sprocket assembly is intended to be mounted on a free body of a hub of a bicycle rear wheel to be engaged by a transmission chain.

As known, the motion transmission system of a bicycle comprises a pair of pedal cranks, on which the cyclist exerts a propulsive thrust, one or more guiding toothed wheels, set in rotation by direct coupling with the pedal cranks, and a plurality of driven toothed wheels, also called sprockets, of different sizes, set in rotation by the guiding toothed wheels through a transmission chain.

The sprockets are coupled with the rear wheel of the bicycle through a hub. This comprises a first body rigidly coupled to the rim of the bicycle through spokes, and a second body rigidly coupled with the sprockets and capable of rotating freely with respect to the first body in one direction of rotation, and of pulling it in rotation in the opposite direction, thus giving the advancing motion to the driving rear wheel. In the technical jargon, this second body is called "free body". The totality of the sprockets, or toothed wheels, mounted on the free body is commonly called "sprocket assembly".

The transmission chain consists of a succession of links, each normally consisting of a pair of plates facing one another and spaced to define an insertion space of a tooth of a toothed wheel. The plates of one link are rotatably coupled with the plates of the next link through a rivet, which in turn is wound around by a roller or bush capable of rotating freely with respect to the rivet.

The sprockets of the sprocket assembly can comprise a radially inner annular portion provided with grooves adapted for engaging the grooves of the free body. In this case, the sprockets are axially spaced from one another by spacers usually having a cylindrical shape.

Alternatively, the sprockets of the sprocket assembly can be connected together to form an assembly of toothed wheels supported by a cylindrical element having a radially inner surface provided with grooves adapted for engaging the grooves of the free body.

In this case, the sprockets that are axially connected together can be two or more, even to the point of being the totality of the sprockets that make the sprocket assembly.

A great problem linked to the use (especially when used professionally) of the bicycle is the so-called "chain drop" phenomenon. Such a phenomenon relates to the disengagement of the transmission chain from the toothed wheels of the crankset or of the sprocket assembly.

When this happens, the transmission chain is no longer capable of transmitting the propulsive action exerted by the cyclist on the pedal cranks to the rear wheel and the cyclist is forced to stop the bicycle and to reposition the transmission chain.

U.S. Pat. No. 5,273,495 describes a device for repositioning the transmission chain on the toothed wheels of the crankset when a chain drop occurs on the crankset, thus preventing the cyclist from having to stop to reposition the transmission chain on the crankset.

Document TW I396648B1 describes a system for preventing the chain from dropping from the smallest sprocket of the sprocket assembly. Such a system provides for the insertion of a ring in a space created between the smallest toothed wheel and the bicycle frame. Such a ring has dimensions that are similar to the dimensions of the smallest toothed wheel of the sprocket assembly, so as to act as a further (toothless) wheel that receives the transmission chain in the case of the chain dropping. The cyclist, by actuating the rear derailleur, is thus capable of repositioning the chain on the smallest toothed wheel without stopping the bicycle.

SUMMARY

The Applicant has found that when the chain drop relates to the sprocket having the largest diameter of the sprocket assembly, the chain drop can cause much worse consequences than the simple interruption of the propulsive action.

The Applicant has verified that when the chain drop relates to the sprocket having the largest diameter of the sprocket assembly, it may be that the rear wheel suddenly locks, with the consequent danger of the cyclist falling.

Indeed, the sprocket having the largest diameter of the sprocket assembly directly faces the spokes of the wheel, and therefore in the case of the chain dropping, the latter is positioned between the sprocket having the largest diameter and the spokes of the wheel.

The spokes of the wheel are usually inclined with respect to the (vertical) plane of the sprocket and in particular move away from the plane of the sprocket as the distance from the hub of the wheel increases.

Between the sprocket and the spokes of the wheel a wedge-shaped space is therefore created (the vertex of which faces towards the hub of the wheel) in which the transmission chain tends to jam, locking and preventing a free rotation of the sprocket assembly with respect to the wheel.

When this happens, as well as putting the cyclist in danger (consider for example sudden locking of the rear wheel during a high-speed descent), the repositioning of the transmission chain becomes very complicated since it is necessary to free the transmission chain jammed between sprocket and spokes of the bicycle.

The Applicant has perceived that by providing a supporting assembly that projects axially beyond the axially inner surface of the first toothed wheel of the sprocket assembly (in other words the surface of the sprocket having the most teeth facing towards the wheel of the bicycle), it is possible to at least partially support the transmission chain at a predetermined radial distance from the hub of the wheel in the case of the chain dropping from the first toothed wheel.

The Applicant has verified that this makes it possible to avoid the chain jamming between the first toothed wheel and spokes of the bicycle, avoiding the locking of the rear wheel in the case of the chain dropping.

The Applicant has further verified that the supporting assembly does not require any restriction on the number of toothed wheels of the sprocket assembly, since the supporting assembly is positioned in a space, comprised between largest toothed wheel of the sprocket assembly and spokes of the rear wheel, always present regardless of the number of toothed wheels of the sprocket assembly.

BRIEF DESCRIPTION OF THE DRAWINGS

The features and advantages of the invention will become clearer from the following description of preferred embodiments thereof, made with reference to the attached drawings. In such drawings.

DETAILED DESCRIPTION OF THE PREFERRED EMBODIMENTS

The present invention relates, according to a first aspect, to a sprocket assembly component comprising:

at least one first toothed wheel configured to be the toothed wheel having the most teeth of the sprocket assembly, said first toothed wheel comprising an axially inner surface;

a supporting assembly that extends in the axial direction up to a free end arranged axially more internally with respect to the axially inner surface of the first toothed wheel.

In a second aspect, the present invention relates to a motion transmission system of a bicycle comprising a sprocket assembly having a sprocket assembly component in accordance with the first aspect of the invention and a transmission chain configured to engage the sprockets of the sprocket assembly.

The sprocket assembly component, as well as the sprocket assembly, is configured to rotate around a rotation axis coinciding with the rotation axis of the rear wheel. Such a rotation axis passes through the center of every sprocket (or toothed wheel) and is the main reference axis for the elements that form part of the present invention; all of the indications of direction and similar, such as "axial", "radial", "circumferential", "diametral" will refer to this. The indications "towards the outside", "externally" and "towards the inside", "internally" referring to radial directions must be interpreted, respectively, as away from the axis or towards the axis. The indications "towards the outside", "externally" and "towards the inside", "internally" referring to axial directions must be interpreted, respectively, as away from the wheel of the bicycle or towards the wheel of the bicycle (when the sprocket assembly is in use).

The present invention can comprise one or more of the following preferred features, taken individually or in combination, that can refer to the first and/or to the second aspect of the present invention.

Preferably, the teeth of the first toothed wheel are separated from one another by respective troughs; said supporting assembly being radially inner with respect to the radially innermost point of said troughs.

In this way, when the transmission chain is regularly engaged on the first toothed wheel, the supporting assembly does not interfere with the transmission chain.

Preferably, said supporting assembly comprises a radially outer surface substantially perpendicular to the axially inner surface of the first toothed wheel; said radially outer surface extending up to said free end.

The radially outer surface acts as a support for the transmission chain in the case of the chain dropping.

Preferably, said supporting assembly comprises a substantially annular protuberance.

The substantially annular protuberance carries out a continuous support, in other words without circumferential interruptions for the transmission chain.

By arranging the substantially annular protuberance without unevenness or projections on its radially outer surface, the transmission chain can slide without catching on the radially outer surface, further decreasing the risk of the transmission chain being able to jam between first toothed wheel and rear wheel.

Preferably, said substantially annular protuberance is arranged on the axially inner surface of the first toothed wheel.

In this way, the first toothed wheel and the supporting assembly can be made in one piece.

Furthermore, in this case, the sprocket assembly component can comprise a single toothed wheel, in other words the first toothed wheel.

Alternatively, said supporting assembly comprises a plurality of axial protuberances circumferentially spaced from one another.

This makes it possible to reduce the total weight of the component without giving up efficiency in use.

Preferably, a second toothed wheel has a smaller number of teeth than the number of teeth of the first toothed wheel and a plurality of connection bodies that mechanically connect the first and the second toothed wheel, axially spacing them.

Preferably, said supporting assembly is connected to said connection bodies.

In this way, the connection bodies, as well as allowing the mechanical connection between the first and the second toothed wheel, make it possible to position the supporting assembly.

Preferably, each connection body comprises a first connection portion secured to the first toothed wheel that extends radially towards the second toothed wheel; said protuberances extending from said first connection portion.

Preferably, said free end is arranged at a distance comprised between 2 mm and 6 mm from the axially inner surface of the first toothed wheel.

The exact axial position of the free end is a function of the diameter of the first toothed wheel, of the thickness of the transmission chain and of the camber of the spokes of the rear wheel facing towards the first toothed wheel, in other words of the inclination of the spokes with respect to a direction perpendicular to the rotation axis of the wheel.

Such an axial position must in any case ensure that the transmission chain, in the case of the chain dropping, does not go past the supporting assembly but is intercepted and supported by it.

Preferably, when in use, said supporting assembly is arranged at a radial height at which the axial distance between the axially inner surface of the first toothed wheel and the spokes of the rear wheel is equal to or greater than the thickness in the axial direction of the transmission chain.

In this way, the transmission chain, when engaged on the supporting assembly, does not obstruct the free rotation of the rear wheel and does not jam between the spokes of the rear wheel and the first toothed wheel.

Preferably, the axial distance between the free end of the supporting assembly and the spokes of the rear wheel is less than the thickness in the axial direction of the transmission chain.

In this way, as stated, the transmission chain in the case of the chain dropping does not go past the supporting assembly and is intercepted and supported by it.

Preferably, the distance between said free end and said inner surface of the first toothed wheel is equal to or less than the thickness in the axial direction of the transmission chain.

In this way, the free end of the supporting assembly (which defines the axially innermost point of the supporting assembly) does not interfere with the rotation of the rear wheel.

Preferably, the radial distance between the radially outermost point of the teeth of the first toothed wheel and said supporting assembly is greater than the thickness in the radial direction of the transmission chain.

In the figures, some preferred embodiments of a sprocket assembly component in accordance with the present invention are shown. Identical reference numerals refer to identical features of every embodiment, the differences between them will be clear hereinafter.

With reference to the drawings, the sprocket assembly component is wholly indicated with 10.

The component 10 comprises a first toothed wheel 11 which is configured to be used as toothed wheel having the largest dimeter of the sprocket assembly.

The first toothed wheel 11 is rotatable around a rotation axis X that coincides with the rotation axis of a rear wheel 100 of the bicycle.

In the examples illustrated in the attached figures, the component 10 further comprises a second toothed wheel 12 and a third toothed wheel 13 concentric to the rotation axis X which have decreasing diameters from the diameter of the first toothed wheel 11. The three toothed wheels 11, 12, 13 make a so-called "triplet".

With particular reference to the embodiments illustrated in the attached drawings, the component 10 comprises a plurality of connection bodies 30 that mechanically connect the first toothed wheel 11 and the second toothed wheel 12 spacing them apart in the axial direction.

The number of connection bodies 30 is a function of the dimensions of the two toothed wheels connected by the same and of the degree of structural rigidity that it is wished to obtain.

The greater the dimensions of the two toothed wheels, the greater the number of connection bodies 30. The maximum limit to the number of connection bodies is equal to the number of troughs 15 present on the second toothed wheel 12.

Each connection body 30 comprises a first connection portion 31 secured to the first toothed wheel 11 that extends radially from the same towards the second toothed wheel 12.

Figure 4:
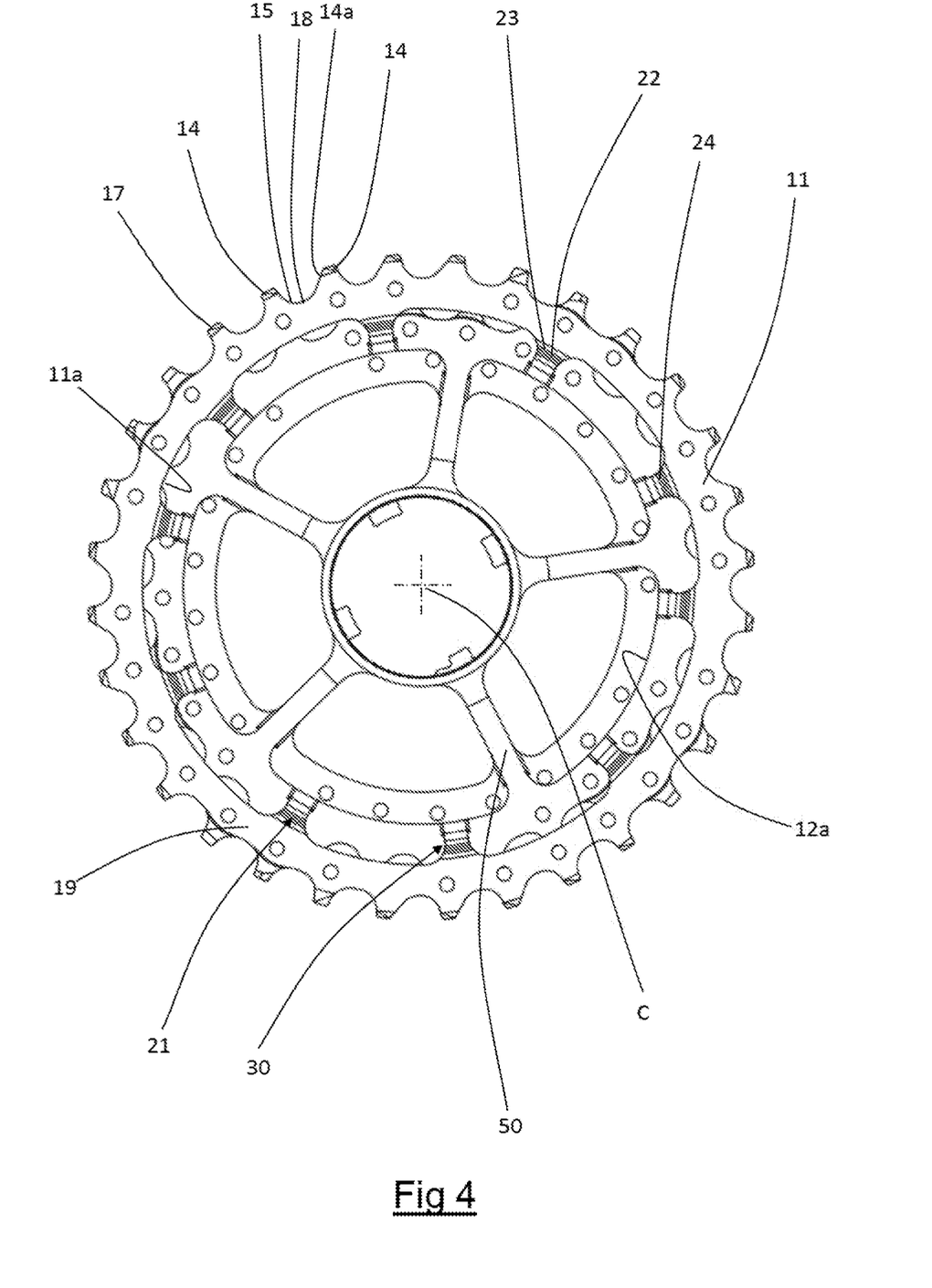
FIG. 4 is a rear view of the component of FIG. 2.

As better illustrated in FIG. 4, the first connection portion 31 extends from a radially inner edge 11a of the first toothed wheel 11 and moves away from the same in the radially inner direction.

The first toothed wheel 11 is preferably in one piece with, in other words is made together with, the first connection portion 31.

The extension in the radial direction of the first connection portion 31 is a function of the diameters of the first 11 and of the second toothed wheel 12; the less the difference between the two diameters, the less the extension in the radial direction of the first connection portion 31.

Each connection body 30 further comprises a second connection portion 32 secured to the second toothed wheel 12 that extends axially from it.

The second connection portion 32 is formed in one piece with the first connection portion 31.

The second connection portion 32 is further formed in one piece with the first toothed wheel 11.

The second connection portion 32 extends in the axial direction by the same amount that axially separates the first 11 and the second toothed wheel 12.

Figure 6:
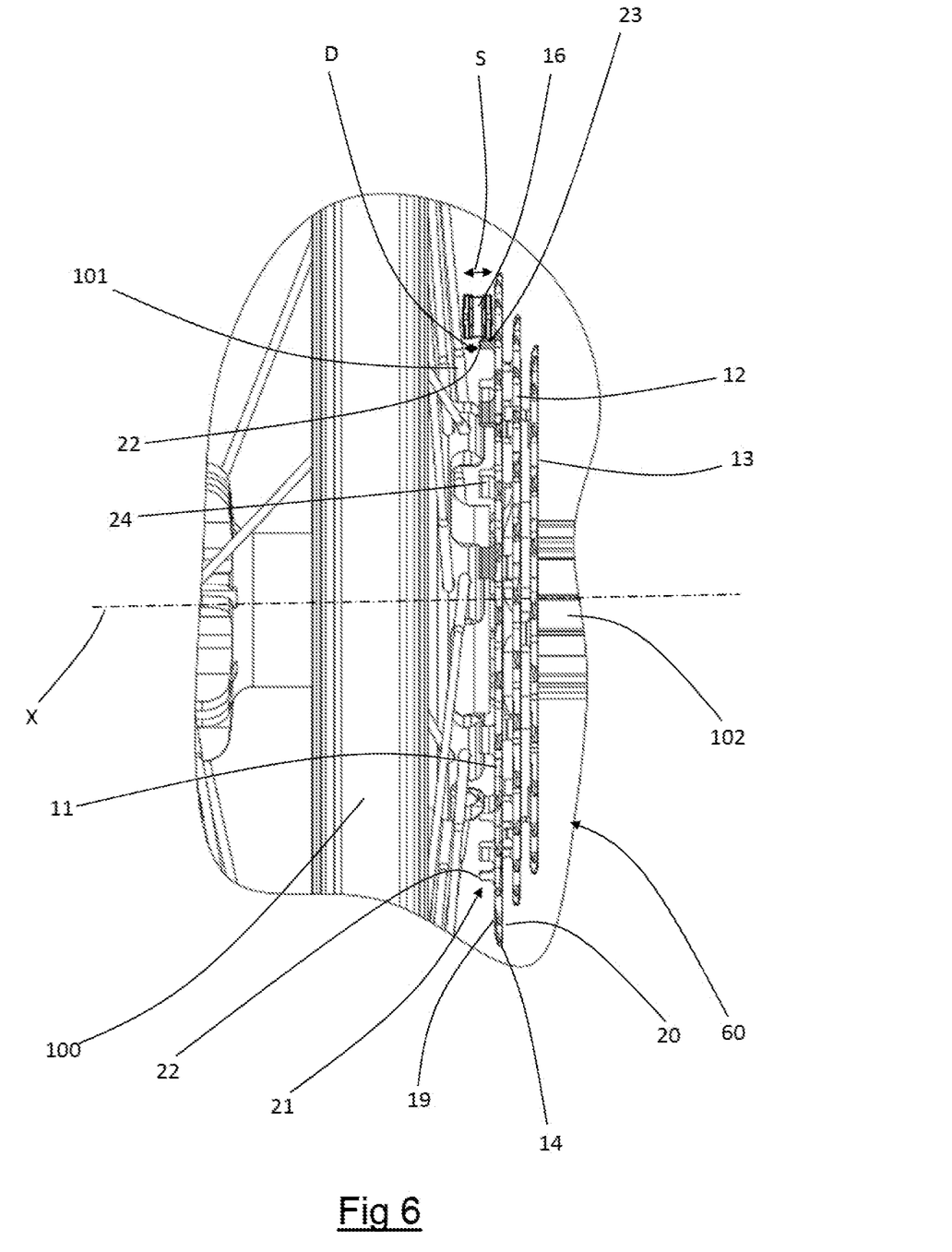
FIG. 6 is a partial view of a motion transmission system of a bicycle in accordance with the present invention.

The second toothed wheel 12 is connected to a radially inner cylindrical portion 40 which is configured to engage a free body 102 of the hub of the rear wheel of the bicycle as shown in FIG. 6.

The radially inner cylindrical portion 40 comprises an interface surface 41 with the free body from which a plurality of protuberances 42 project.

The protuberances 42 are intended to engage respective grooved profiles (not illustrated) counter-shaped to the protuberances 42 and arranged on the free body to make a shape coupling capable of transmitting pairs of forces between the free body and the radially inner cylindrical portion 40 and vice-versa.

The mechanical coupling between the radially inner cylindrical portion 40 and the second toothed wheel 12 is obtained by a plurality of radial spokes 50 that extend from the cylindrical portion 40 and reach respective radially inner edges 12a of the second toothed wheel 12.

The radial spokes 50 have a rectilinear extension and a length in the radial direction such as to allow the correct radial positioning of the teeth of the second toothed wheel 12.

The radial spokes 50 are preferably made in one piece with the second toothed wheel 12 and with the radially inner cylindrical portion 40.

The third toothed wheel 13 is also connected to the radially inner cylindrical portion 40 by the radial spokes 50.

In other embodiments that are not illustrated, the component 10 can comprise only the first toothed wheel 11, only the first 11 and the second toothed wheel 12 or a number of toothed wheels greater than three, for example from four to eleven.

From the following it will become clear and obvious when the component 10 can comprise only the first toothed wheel 11 or when the component 10 must comprise at least the first 11 and the second toothed wheel 12.

The first toothed wheel 11 (as well as the other toothed wheels when provided) comprises a plurality of teeth 14 separated from one another by a plurality of troughs 15.

The pitch between the teeth 14, in other words the distance that separates two successive teeth 14, is substantially constant for every toothed wheel and substantially identical in all of the toothed wheels.

The teeth 14 are configured to receive the links of a transmission chain 16 in engagement (illustrated in FIG. 6). In particular, the teeth 14 are configured to insert in succession, during the rotation of the first toothed wheel 11, in insertion spaces axially delimited by pairs of plates of the transmission chain.

As illustrated in FIG. 4, each tooth 14 of the first toothed wheel 11 has a radially outermost end portion 17 arranged at a maximum radial distance from the center C of the toothed wheel.

The center C of the toothed wheel is crossed by the rotation axis X.

Each tooth 14 further has respective side edges 14a that degrade, diverging, in a radially inner direction from the end portion 17 joining to the trough 15.

Each trough 15 has a substantially arched profile and has a radially innermost point 18 closest to the center C of the first toothed wheel 11.

The first toothed wheel 11 comprises an axially inner surface 19 which faces towards the wheel 100 of the bicycle.

The first toothed wheel 11 further comprises an axially outer surface 20 facing towards the other sprockets of the sprocket assembly.

Figure 3:
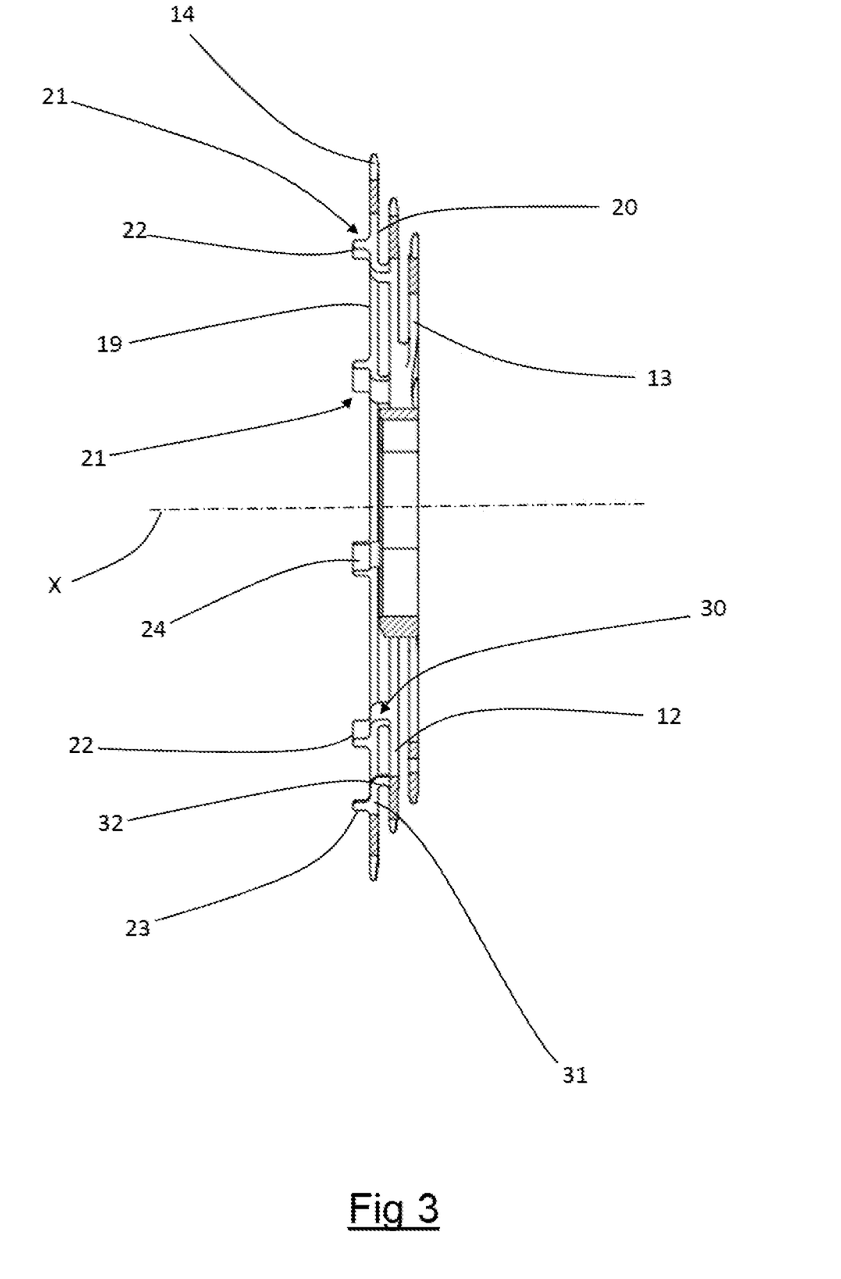
FIG. 3 is a section view along the plane III-III of the component of FIG. 2.

The teeth 14 extend radially away from the axially inner surface 19 and from the radially outer surface 20 and are axially arranged between such two surfaces 19, 20 (FIG. 3).

The component 10 further comprises a supporting assembly 21 which has an axially innermost free end 22 of the axially inner surface 19 of the first toothed wheel 11.

As better illustrated in FIG. 6, the free end 22 of the supporting assembly 21 is arranged closer to the wheel 100 of the bicycle with respect to the axially inner surface 19 of the first toothed wheel 11.

The supporting assembly 21 comprises a radially outer surface 23 which has the function of intercepting and at least partially supporting the transmission chain 16 in the case in which it loses the engagement with the first toothed wheel 11 and is positioned axially towards the inside with respect to the first toothed wheel 11.

Concerning this, the supporting assembly 21 and in particular the radially outer surface 23 thereof is arranged at a distance from the center C of the first toothed wheel 11 such that the distance D between the free end 22 of the supporting assembly 21 and the spokes 101 of the rear wheel 100 is equal to or less than the thickness S of the transmission chain 16, as illustrated in FIG. 6.

The exact radial position of the supporting assembly 21 with respect to the first toothed wheel 11 is a function of the diameter of the first toothed wheel 11, of the thickness of the chain 16 and of the camber of the spokes 101 of the rear wheel 100 facing towards the first toothed wheel 11, in other words of the inclination of the spokes 101 with respect to a direction perpendicular to the rotation axis X.

In any case, the supporting assembly 21 is arranged radially more internally than the radially innermost point 18 of the troughs 15 of the first toothed wheel 11.

In the preferred embodiments of the invention, the distance measured in the axial direction that separates the free end 22 from the axially inner surface 19 of the first toothed wheel is comprised between about 2 mm and about 6 mm, preferably about 3 mm.

In a first embodiment (illustrated in FIGS. 2, 3 and 4), the supporting assembly 21 comprises a plurality of axial protuberances 24 circumferentially spaced from one another.

Figure 2:
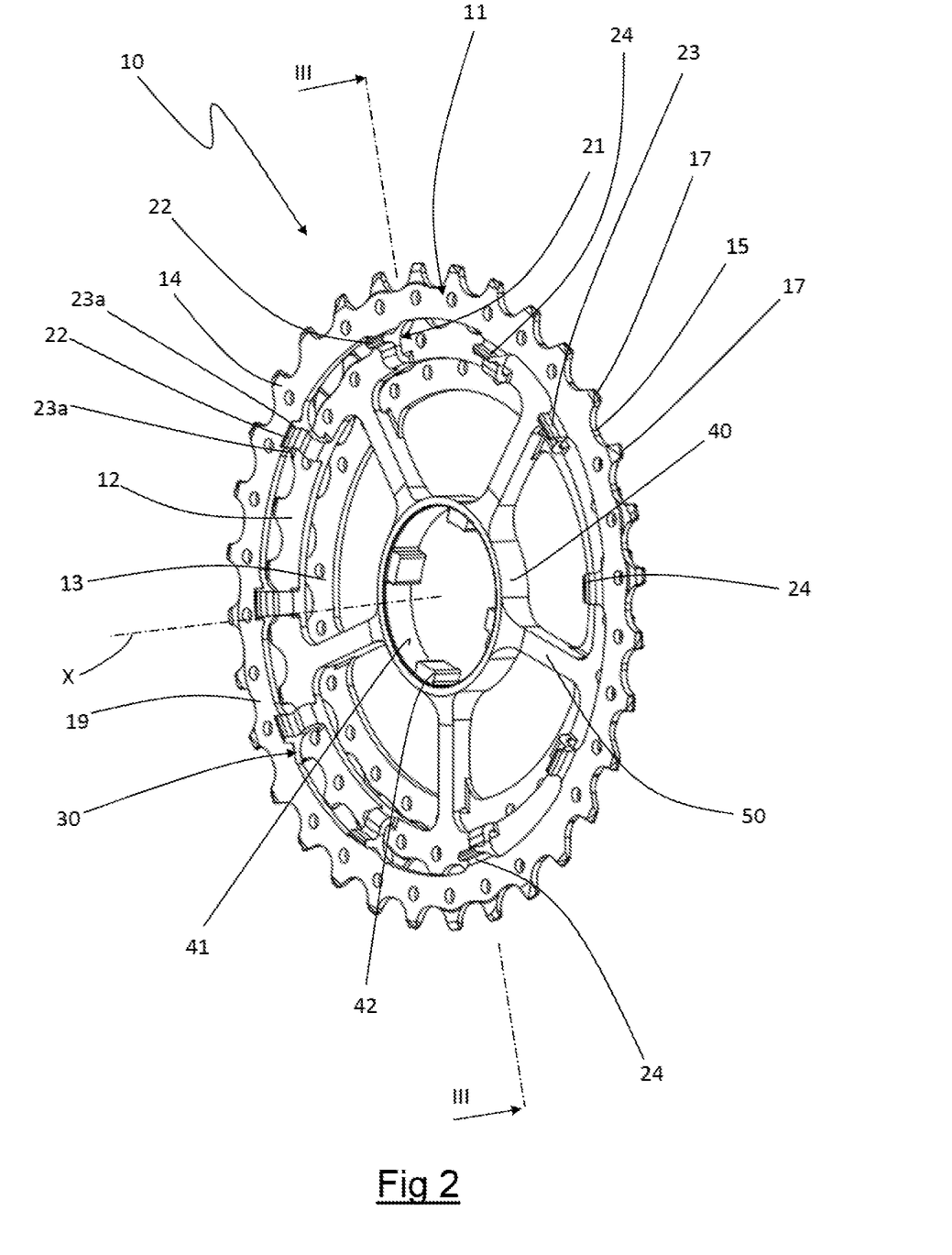
FIG. 2 is a perspective view of a first embodiment of sprocket assembly component according to the invention.

Each axial protuberance 24 has the quoted radially outer surface 23 configured to intercept the transmission chain 16. The radially outer surfaces 23 are substantially parallel to the rotation axis X. In the case in which the axially outer surface 19 of the first toothed wheel 11 is substantially perpendicular to the rotation axis X (as usually happens), the radially outer surfaces 23 are perpendicular to the axially outer surface 19 of the first toothed wheel 11.

Each radially outer surface 23 reaches a respective free end 22 and is circumferentially delimited by respective free edges 23a.

Such free edges 23a are preferably parallel and reach the free end 22 joining to it.

The free end 22 is preferably rounded so as not to have sharp edges.

The free end 22 has a thickness measured in the radial direction that is substantially constant and substantially equal to the thickness of the portion of supporting assembly 21 that carries the radially outer surface 23.

In other words, the supporting assembly 21 does not comprise radially-extending elements that extend from the free end 22.

The free ends 22 of each axial protuberance 24 are axially aligned, in other words they are the same distance from the axially inner surface 19 of the first toothed wheel 11.

In the case in which the component 10 consists of only the first toothed wheel 11, the axial protuberances 24 are directly secured to the axially outer surface 19 of the first toothed wheel 11, so as to project axially from it.

In the case in which the component 10 also comprises a second toothed wheel 12 (like in the embodiments illustrated in the attached figures), the axial protuberances 24 can be secured to connection bodies 30 that connect together the first 11 and the second toothed wheel 12.

In this case, the axial protuberances 24 of the supporting assembly 21 are arranged on the first connection portions 31 and emerge axially from them.

Preferably, on each first connection portion 31 a respective axial protuberance 24 is provided.

The axial protuberances 24 are formed in one piece with the respective first connection portions 31.

As illustrated in FIGS. 2 and 4, the circumferential extension of each axial protuberance 24 is equal to the circumferential extension of the first connection portion 31 on which it is formed.

In the preferred embodiment of the invention, on each first connection portion 31 a respective axial protuberance 24 is formed.

Figure 5:
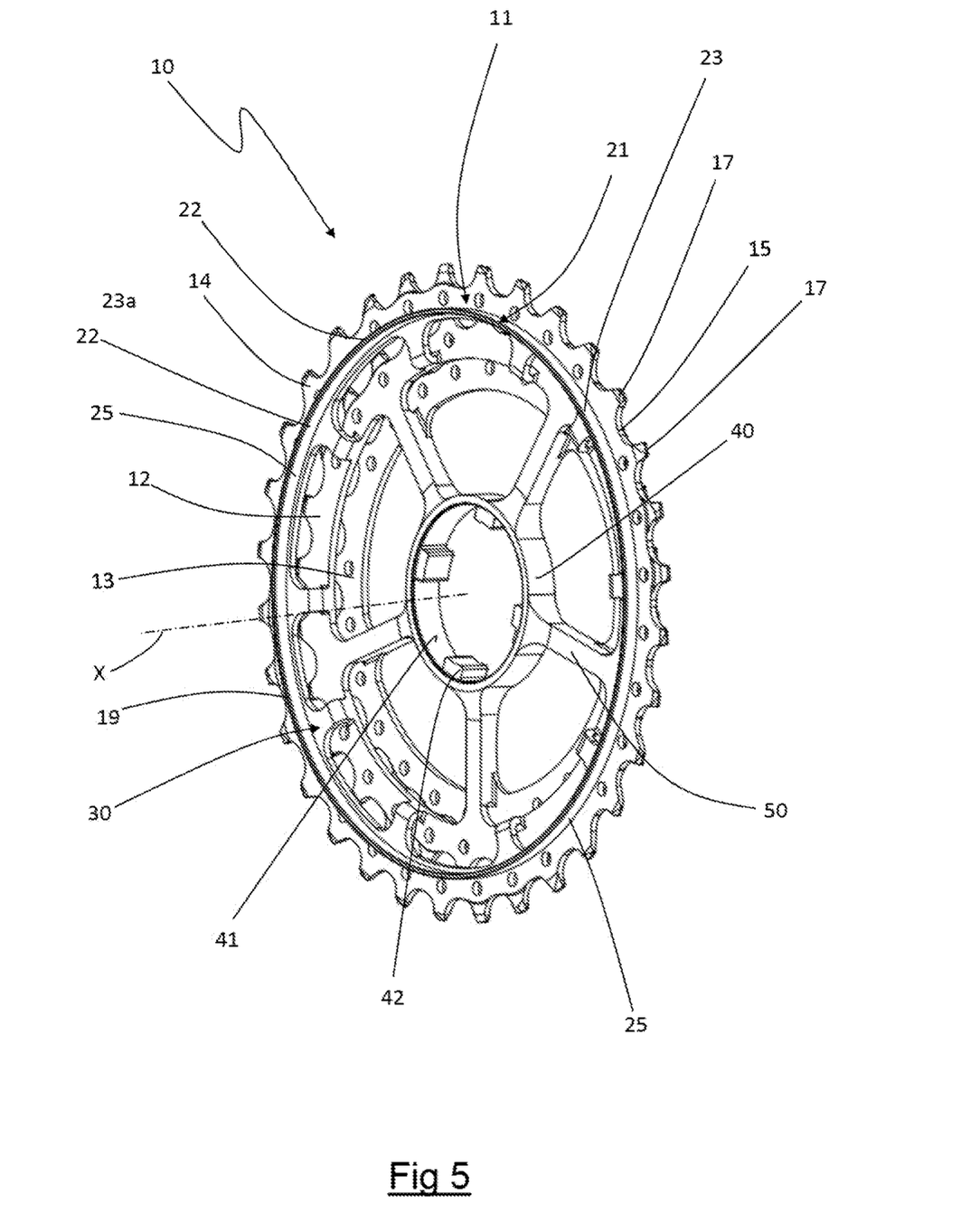
FIG. 5 is a perspective view of a second embodiment of a sprocket assembly component according to the invention.

In the embodiment illustrated in FIG. 5, the supporting assembly 21 comprises an annular protuberance 25.

The annular protuberance 25 has a substantially constant thickness measured in the radial direction and a constant distance from the center C of the first toothed wheel 11.

The annular protuberance 25 can be continuous or can have weight-reducing holes or openings that cross the annular protuberance 25 in the axial direction.

The annular protuberance 25 is, in the preferred embodiment, directly secured to the axially inner surface 19 of the first toothed wheel 11 and is preferably in one piece with the first toothed wheel 11.

In this case, the component 10 can comprise only the first toothed wheel 11 or, as illustrated in FIG. 5, it can also comprise the second toothed wheel 12.

FIG. 6 illustrates a portion of a motion transmission system 60 of a bicycle that comprises the component 10.

Figure 1:
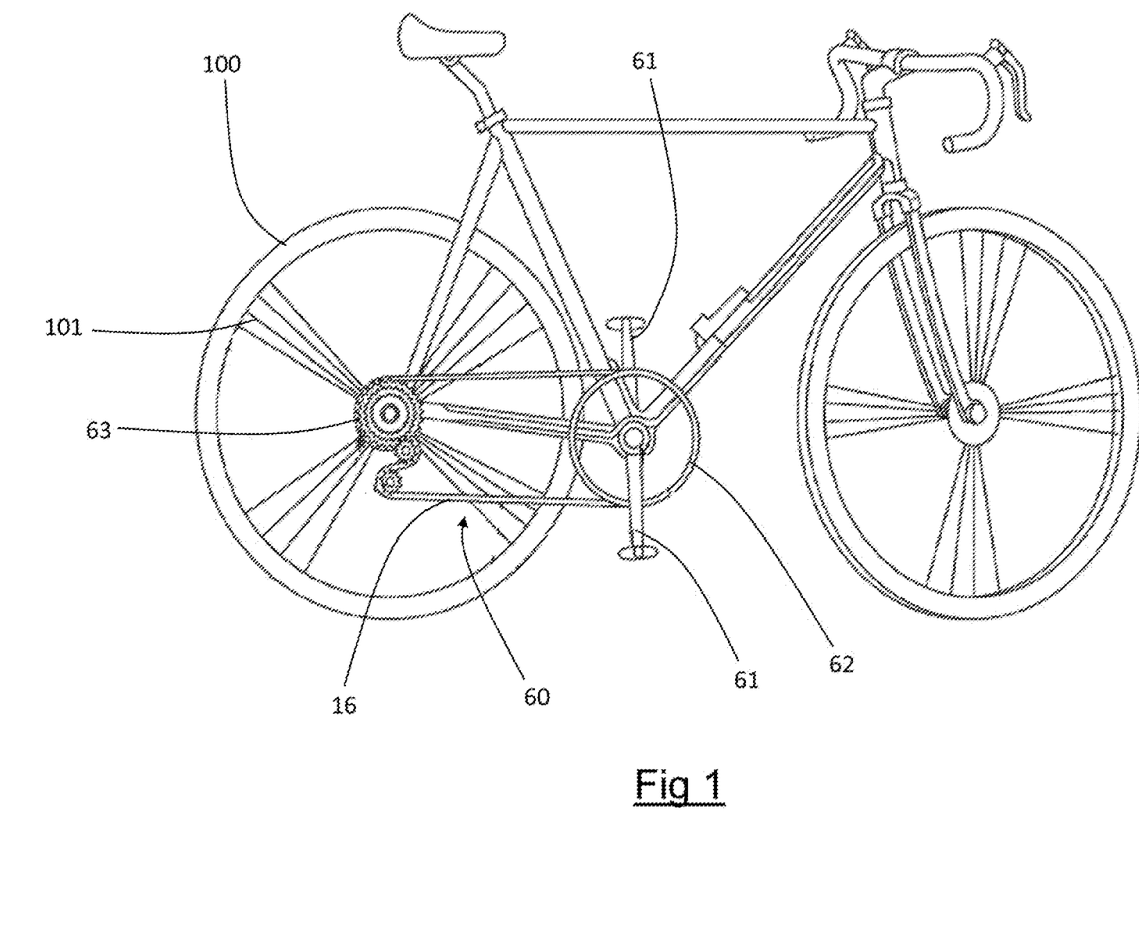
FIG. 1 is a schematic view of a bicycle comprising the sprocket assembly component according to the invention.

The motion transmission system 60 comprises a pair of pedal cranks 61, one or more guiding toothed wheels 62, a sprocket assembly 63 associated with the rear wheel 100 and a transmission chain 16, as schematically illustrated in FIG. 1.

As represented in FIG. 6, when the transmission chain 16 jumps from the first toothed wheel 11 in the direction of the rear wheel 100, the supporting assembly 21 acts as partial support for the transmission chain 16 preventing it from being able to insert deeply (i.e. until it reaches the hub) in the space between first toothed wheel 11 and spokes 101 of the rear wheel 100.

In particular, as stated, the distance D between the spokes 101 of the rear wheel 100 and the free end 22 of the supporting assembly 21 is less than the thickness S (measured in the axial direction) of the transmission chain 16, thus preventing the transmission chain 16 from passing over the supporting assembly 21 and jamming between the spokes 101 and the first toothed wheel 101.

For this purpose, the distance, measured in the axial direction and at the radial height of the radially outer surface 23 of the supporting assembly 21, between the axially inner surface 19 of the first toothed wheel 11 and the spokes 101 of the rear wheel 100 is greater than or equal to the thickness S of the transmission chain 16, allowing the rear wheel to rotate freely when the transmission chain 16 rests on the radially outer surface 23 of the supporting assembly 21.

Of course, one skilled in the art can bring numerous modifications and variants to the invention described above, in order to satisfy specific and contingent requirements, like for example making the supporting assembly 21 of a different material from that of the first toothed wheel, securing the supporting assembly 21 to the second or third toothed wheel through specific securing elements, all in any case encompassed by the scope of protection of the present invention as defined by the following claims.

What is claimed is:

1. A sprocket assembly component comprising:
    at least one first toothed wheel configured to be the toothed wheel having the most teeth of a sprocket assembly, said first toothed wheel comprising an axially inner surface;
    a second toothed wheel having a smaller number of teeth than the number of teeth of the first toothed wheel;
    a plurality of connection bodies that mechanically connect and axially space the first and the second toothed wheels from each other; and
    a supporting assembly that extends in an axial direction up to a free end arranged axially more internally with respect to the axially inner surface of the first toothed wheel;
    wherein each connection body comprises:
        a first connection portion that extends radially from the first toothed wheel towards the second toothed wheel, and
        a second connection portion that extends axially from the second toothed wheel towards to the first toothed wheel;
    wherein the first toothed wheel, the second toothed wheel, the first connection portion, the second connection portion, and the supporting assembly are formed as one piece.

2. The sprocket assembly component according to claim 1, wherein the teeth of the first toothed wheel are separated from one another by respective troughs; said supporting assembly being radially inner with respect to a radially innermost point of said troughs.

3. The sprocket assembly component according to claim 1, wherein said supporting assembly comprises a radially outer surface substantially perpendicular to the axially inner surface of the first toothed wheel; said radially outer surface extending up to said free end.

4. The sprocket assembly component according to claim 1, wherein said supporting assembly comprises a substantially annular protuberance.

5. The sprocket assembly component according to claim 4, wherein said substantially annular protuberance is arranged on the axially inner surface of the first toothed wheel.

6. The sprocket assembly component according to claim 1, wherein said supporting assembly comprises a plurality of axial protuberances circumferentially spaced from one another.

7. The sprocket assembly component according to claim 1, further comprising a third toothed wheel having a smaller number of teeth than the number of teeth of the second toothed wheel.

8. The sprocket assembly component according to claim 6, wherein said axial protuberances extending from said first connection portion.

9. The sprocket assembly component according to claim 1, wherein said free end is arranged at a distance in a range between 2 mm and 6 mm from the axially inner surface of the first toothed wheel.

10. The sprocket assembly component according to claim 1, wherein when in use, said supporting assembly is arranged at a radial height at which an axial distance between the axially inner surface of the first toothed wheel and spokes of a rear wheel is equal to or greater than a thickness (S) in the axial direction of a transmission chain.

11. The sprocket assembly component according to claim 10, wherein an axial distance between the free end of the supporting assembly and the spokes of the rear wheel is less than the thickness (S) in the axial direction of the transmission chain.

12. The sprocket assembly component according to claim 2, wherein said supporting assembly comprises a radially outer surface substantially perpendicular to the axially inner surface of the first toothed wheel; said radially outer surface extending up to said free end.

13. The sprocket assembly component according to claim 2, wherein said supporting assembly comprises a substantially annular protuberance.

14. The sprocket assembly component according to claim 13, wherein said substantially annular protuberance is arranged on the axially inner surface of the first toothed wheel.

15. The sprocket assembly component according to claim 3, wherein said supporting assembly comprises a substantially annular protuberance.

16. The sprocket assembly component according to claim 15, wherein said substantially annular protuberance is arranged on the axially inner surface of the first toothed wheel.

17. A motion transmission system of a bicycle comprising a sprocket assembly having a sprocket assembly component according to claim 1 and a transmission chain configured to engage said first toothed wheel.

18. The motion transmission system according to claim 17, wherein a distance between said free end and the inner surface of the first toothed wheel is equal to or less than a thickness in the axial direction of the transmission chain.

19. The motion transmission system according to claim 17, wherein the radial distance between the radially outermost point of the teeth of the first toothed wheel and the supporting assembly is greater than a thickness in the radial direction of the transmission chain.

* * * * *